United States Patent [19]

Endo et al.

[11] Patent Number: 4,835,627
[45] Date of Patent: * May 30, 1989

[54] MAGNETIC RECORDER/REPRODUCER

[75] Inventors: Kazuhito Endo; Masayuki Ishida; Yoshinobu Ishida, all of Nagaokakyo, Japan

[73] Assignee: Mitsubishi Denki Kabushiki Kaisha, Tokyo, Japan

[*] Notice: The portion of the term of this patent subsequent to Jun. 23, 2004 has been disclaimed.

[21] Appl. No.: 19,612

[22] Filed: Feb. 27, 1987

Related U.S. Application Data

[63] Continuation of Ser. No. 696,051, Jan. 29, 1985, Pat. No. 4,675,754.

[30] Foreign Application Priority Data

| Feb. 21, 1984 | [JP] | Japan | 59-32130 |
| Mar. 16, 1984 | [JP] | Japan | 59-51866 |
| Mar. 30, 1984 | [JP] | Japan | 59-64584 |

[51] Int. Cl.$^4$ .......................... G11B 5/00; G11B 5/09
[52] U.S. Cl. .......................... 360/32; 360/48; 371/2
[58] Field of Search .......................... 360/32, 48; 371/39, 371/40, 45, 2

[56] References Cited

U.S. PATENT DOCUMENTS 4,544,958  10/1985  Odaka .................. 360/32

Primary Examiner—Vincent P. Canney
Attorney, Agent, or Firm—Lowe, Price, LeBlanc, Becker & Shur

[57] ABSTRACT

A magnetic recorder/reproducer converts two-channel analog signals into digital signals by a sample-and-hold-/A-D converter circuit (3) and controls addresses in a memory circuit (4) by a memory address control circuit (5), to distribute the digital signals into odd sample groups and even sample groups per each channel for arraying the odd sample groups and the even sample groups of the same channel in alternate scanning intervals, thereby to write the same in the memory circuit so that the odd samples and the even samples of the same channel are arrayed in positions separated from each other along the direction of scanning by rotary heads (10, 11). The digital signals thus permutated are modulated by a modulation circuit (7), to be recorded in a magnetic tape by the rotary heads. The digital signals reproduced by the rotary heads are demodulated by a demodulation circuit (14), to be stored in a memory circuit (15). A memory address control circuit (16) controls addresses so as to permutate samples of the reproduced digital signals stored in the memory circuit to be in the original array thereof. The reproduced digital signals read from the memory circuit are converted into analog signals by a D-A converter (18), to be outputted through a low-pass filter (19).

24 Claims, 8 Drawing Sheets

|  | | L CHANNEL(A) | | | | R CHANNEL(B) | | | | R CHANNEL(B) | | | | L CHANNEL(A) | | | |
|---|---|---|---|---|---|---|---|---|---|---|---|---|---|---|---|---|---|
|  |  | 0 | 1 | 2 | 3 | 4 | 5 | 6 | 7 | 8 | 9 | 10 | 11 | 12 | 13 | 14 | 15 |
|  | 0 | $W_{L0}$ | $W_{L2}$ | $W_{L4}$ | $W_{L6}$ | $W_{R1}$ | $W_{R3}$ | $W_{R5}$ | $W_{R7}$ | $W_{R0}$ | $W_{R2}$ | $W_{R4}$ | $W_{R6}$ | $W_{L1}$ | $W_{L3}$ | $W_{L5}$ | $W_{L7}$ |
|  | 1 | $W_{L8}$ | $W_{L10}$ | $W_{L12}$ | $W_{L14}$ | $W_{R9}$ | $W_{R11}$ | $W_{R13}$ | $W_{R15}$ | $W_{R8}$ | $W_{R10}$ | $W_{R12}$ | $W_{R14}$ | $W_{L9}$ | $W_{L11}$ | $W_{L13}$ | $W_{L15}$ |
| 1 FRAME LENGTH | 2 | $W_{L16}$ | $W_{L18}$ | $W_{L20}$ | $W_{L22}$ | $W_{R17}$ | $W_{R19}$ | $W_{R21}$ | $W_{R23}$ | $W_{R16}$ | $W_{R18}$ | $W_{R20}$ | $W_{R22}$ | $W_{L17}$ | $W_{L19}$ | $W_{L21}$ | $W_{L23}$ |
|  | 3 | $W_{L24}$ | $W_{L26}$ | $W_{L28}$ | $W_{L30}$ | $W_{R25}$ | $W_{R27}$ | $W_{R29}$ | $W_{R31}$ | $W_{R24}$ | $W_{R26}$ | $W_{R28}$ | $W_{R30}$ | $W_{L25}$ | $W_{L27}$ | $W_{L29}$ | $W_{L31}$ |
|  | 4 | $C_{L0}$ | $C_{L2}$ | $C_{L4}$ | $C_{L6}$ | $C_{R1}$ | $C_{R3}$ | $C_{R5}$ | $C_{R7}$ | $C_{R0}$ | $C_{R2}$ | $C_{R4}$ | $C_{R6}$ | $C_{L1}$ | $C_{L3}$ | $C_{L5}$ | $C_{L7}$ |
|  |  | $\ell_{L0}$ | $\ell_{L2}$ | $\ell_{L4}$ | $\ell_{L6}$ | $\ell_{R1}$ | $\ell_{R3}$ | $\ell_{R5}$ | $\ell_{R7}$ | $\ell_{R0}$ | $\ell_{R2}$ | $\ell_{R4}$ | $\ell_{R6}$ | $\ell_{L1}$ | $\ell_{L3}$ | $\ell_{L5}$ | $\ell_{L7}$ |

2 SCAN

FIG.8

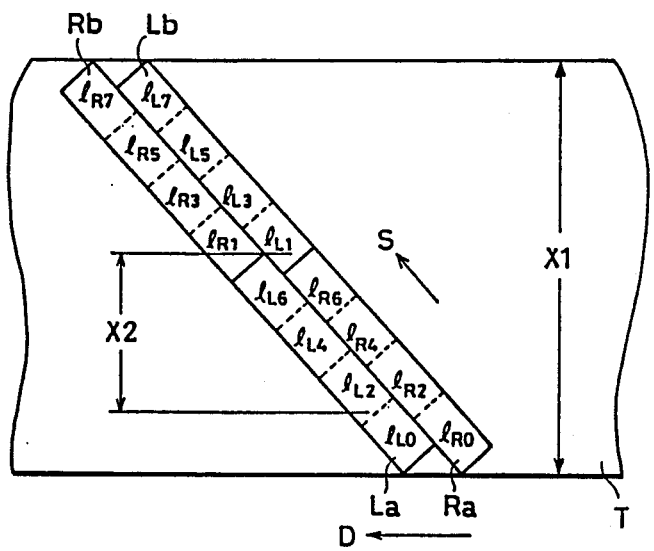

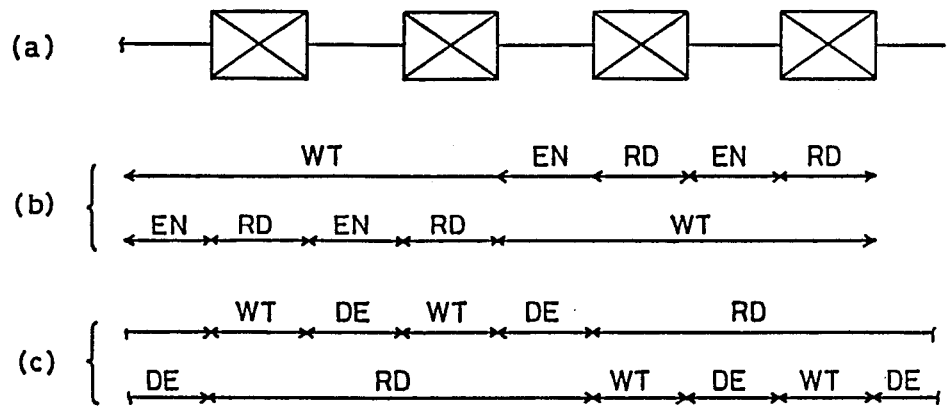

MAGNETIC RECORDER/REPRODUCER

This is a continuation of application Ser. No. 696,051, now U.S. Pat. No. 4,675,754, filed Jan. 29, 1985.

BACKGROUND OF THE INVENTION

1. Field of the Invention

The present invention relates to a magnetic recorder/reproducer. More specifically, it relates to a magnetic recorder/reproducer having rotary heads which converts analog signals into digital signals for slantingly or vertically scanning the same by the rotary heads thereby recording the digital signals in a magnetic tape and reproducing the same, and particularly to an improvement in interleaving of the data thereof.

2. Description of the Prior Art

Heretofore well known in the art is a rotary head-type PCM magnetic recorder/reproducer which converts audio signals into digital signals for recording the digital signals in a magnetic tape and reproducing the recorded digital signals. In general, a rotary head-type PCM magnetic recorder/reproducer employs error correction codes for correcting errors caused in the data upon recording/reproducing of the magnetic tape.

The error correction codes are adapted to correct the errors caused in the data following recording/reproducing of the magnetic tape thereby to reproduce high definition audio signals. However, when the number of the errors is beyond the correction ability to disable the error correction, compensation must be performed by means such as interpolation by taking the mean value of adjacent data. Further, most of the errors caused on the magnetic tape are burst errors, and hence the erroneous data are dispersed by interleaving processing for improving the ability of the error correction codes.

As hereinabove described, compensation processing is performed when the errors cannot be corrected, and mean value interpolation is employed as an effective compensation process with simple circuit structure. Such mean value interpolation is performed on condition that the adjacent data are correct.

Therefore, data of odd sample groups are separated as far as possible from those of even sample groups when the interleaving operation is performed.

FIGS. 1 and 2 show magnetization patterns recorded on a magnetic tape by a conventional rotary head-type PCM magnetic recorder/reproducer.

The following description is made on a rotary head-type PCM magnetic recorder/reproducer of a two-head helical scanning system, which is taken as a typical example.

In FIGS. 1 and 2, a magnetic tape T travels in the direction indicated by an arrow D and is scanned by rotary heads in the direction indicated by an arrow S. The data recorded in the magnetic tape T are of two channels A and B, and distributed into even sample groups a and odd sample groups b. For example, symbol a with symbol A+B indicates even sample groups of the channels A and B, and symbol Aa indicates an even sample group of the channel A.

The volume of interleaving is generally determined in consideration of burst length of errors and correction ability of error correction codes, and an even sample group a and an odd sample group b may be in line over a scanning interval as shown in FIG. 1 or to the contrary.

FIG. 2 shows the even sample groups a and the odd sample groups b arrayed in equally divided scanning intervals. In the interleaving operation performed in this manner, errors are caused in continuous data when one of the rotary heads is instantaneously silted by magnetic powder coming off from the magnetic tape T, i.e., when the reproduced signals from one of the rotary heads are interrupted. Thus, it has been impossible to perform the mean value interpolation, which causes harsh noise.

SUMMARY OF THE INVENTION

Accordingly, an essential object of the present invention is to provide a magnetic recorder/reproducer which can reduce noise caused by a silted rotary head and by errors in the tape travelling direction over a certain width along the cross direction of a magnetic tape.

In an aspect, the present invention provides a magnetic recorder/reproducer which performs coding operation so that error correction codes are completed in one scanning interval and effectively reproduces signals even if a rotary head is silted or a burst error is caused in the tape travelling direction over a certain width, thereby to prevent increase in the clock rate required for error correction.

In summary, the present invention converts analog signals of a plurality of channels into digital signals to distribute the digital signals of the plurality of channels into odd sample groups and even sample groups per each channel, and permutates the sample groups so that the odd sample groups and the even sample groups of the same channel are recorded in alternate scanning intervals in positions separated along the direction of scanning thereby to record the permutated odd sample groups and the even sample groups of the respective channels in a magnetic recording medium by magnetic heads.

Therefore, according to the present invention, the signals may be readily corrected even if reproduced signals from one head are interrupted by, e.g., instantaneous silting of the head caused by magnetic powder coming off from the magnetic tape or a burst error is caused in the tape travelling direction over a wide range along the cross direction of the tape, whereby the signal-to-noise ratio of reproduced sounds or images can be improved. Further, excellent reproduced sounds and images can be obtained by properly selecting samples from the respective groups.

In a preferred embodiment of the present invention, even sample groups of a first channel and odd samples group of a second channel are arrayed in the same scanning intervals while odd sample groups of the first channel and even sample groups of the second channel are arrayed in scanning intervals adjacent to the said same scanning intervals, such that the odd sample groups and the even sample groups of the first channel are recorded in positions separated from each other along the direction of scanning. Or, the even sample groups of the first channel and the even sample groups of the second channel may be arrayed in the same scanning intervals while the odd sample groups of the first channel and the odd sample groups of the second channel are arrayed in scanning intervals adjacent to the said same scanning intervals in such a manner that the odd sample groups and the even sample groups of the first channel are recorded in positions separated along the direction of scanning.

In a second aspect of the present invention, the respective sample groups recorded in the magnetic tape in the aforementioned manner are reproduced by magnetic heads to be permutated in order of sample numbers per each channel and outputted to be converted into analog signals.

In a third aspect of the present invention, the permutated odd sample group and even sample group of each channel in each scanning interval are encoded to generate error correction codes, which are arrayed in the scanning interval including information employed for generating the error correction codes to be recorded.

Therefore, according to the present invention, the error correction codes are so generated and arrayed as to be completed with respect to the data included in one scanning interval, thereby to prevent increase in the clock rate required for encoding and decoding of the data.

The above and other objects, features, aspects and advantages of the present invention will become more apparent from the following detailed description of the present invention when taken in conjunction with the accompanying drawings.

BRIEF DESCRIPTION OF THE DRAWINGS

FIG. 7 is an illustration showing respective sample groups stored in a memory circuit as shown in FIG. 5;

FIG. 8 illustrates a magnetization pattern showing frame array recorded in the memory circuit as shown in FIG. 7;

FIGS. 12A through C is a timing chart showing operation of the memory circuits as shown in FIG. 10;

FIG. 13 is an illustration showing sample groups stored in the memory circuit as shown in FIG. 10;

DESCRIPTION OF THE PREFERRED EMBODIMENTS

Figure 1:
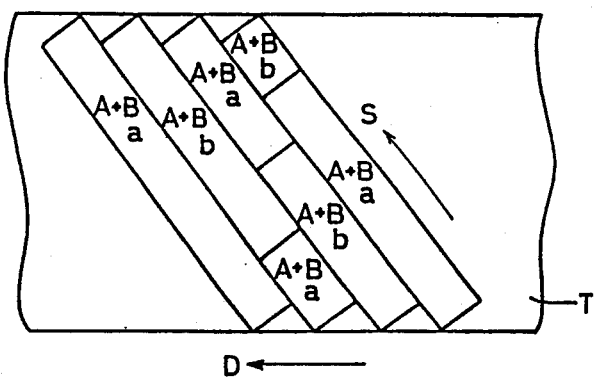
FIGS. 1 and 2 are illustrations showing conventional magnetization patterns.
Figure 2:
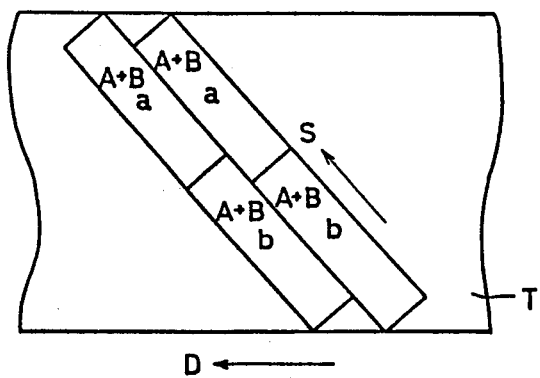
Figure 3:
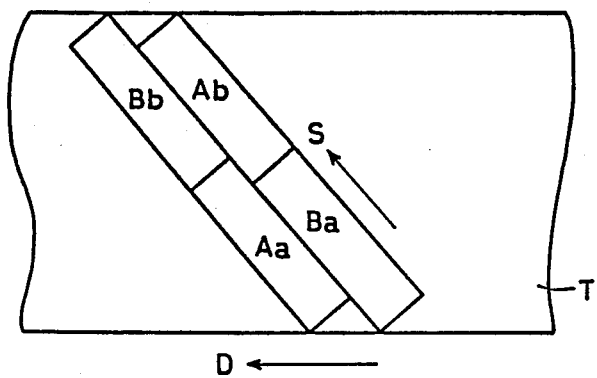
FIGS. 3 and 4 are illustrations showing magnetization patterns according to an embodiment of the present invention.

FIG. 3 is an illustration showing a magnetization pattern recorded on a magnetic tape in an embodiment of the present invention. The principle of the present invention is now described with reference to FIG. 3. In a rotary head-type magnetic recorder/reproducer according to the present invention, interleaving processing is characterized in that even sample groups and odd sample groups of the same channel are arrayed in alternate scanning intervals in positions separated from each other along the direction of scanning by rotary heads. By virtue of such array, at least either the even sample groups or the odd sample groups of the same channel can necessarily be obtained even if signals in one of two rotary heads are interrupted by the aforementioned silting, and hence no continuous sample errors are caused. Further, with respect to a burst error caused along the tape travelling direction in a certain width from the edge of the magnetic tape, either the even sample groups or the odd sample groups of the same channel can be obtained to half the width of the magnetic tape in the cross direction as shown in FIG. 3, whereby no continuous sample errors are caused in the same channel.

Figure 4:
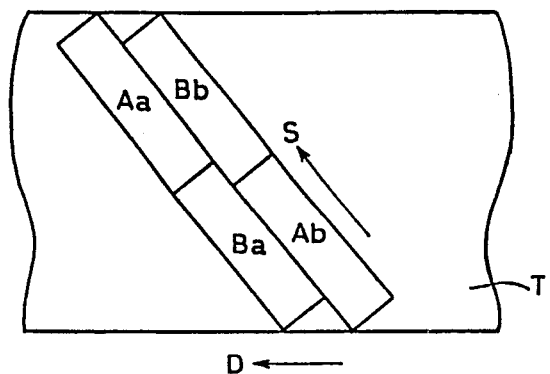

FIG. 4 is an illustration showing another example of the magnetization pattern. Also in the example as shown in FIG. 4, even sample groups and odd sample groups of the same channel are arrayed in alternate scanning intervals in positions separated from each other along the direction of scanning, and hence no sample errors are caused by interruption of signals similarly to the example as shown in FIG. 3.

Figure 6:
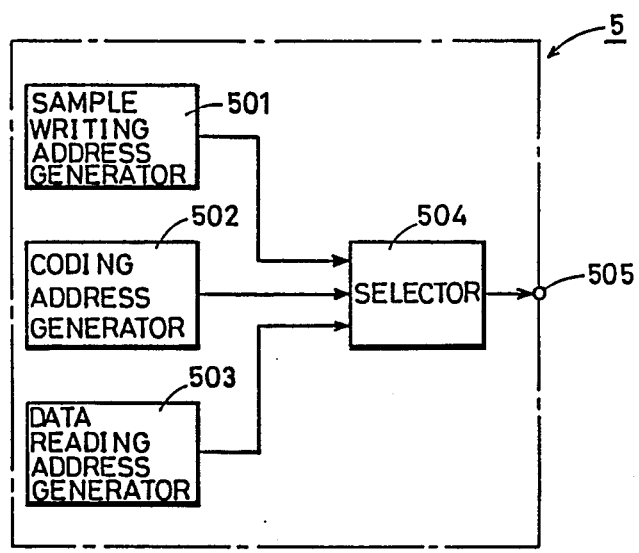
FIG. 6 is a roughly illustrated block diagram showing a memory address control circuit as shown in FIG. 5.
Figure 5:
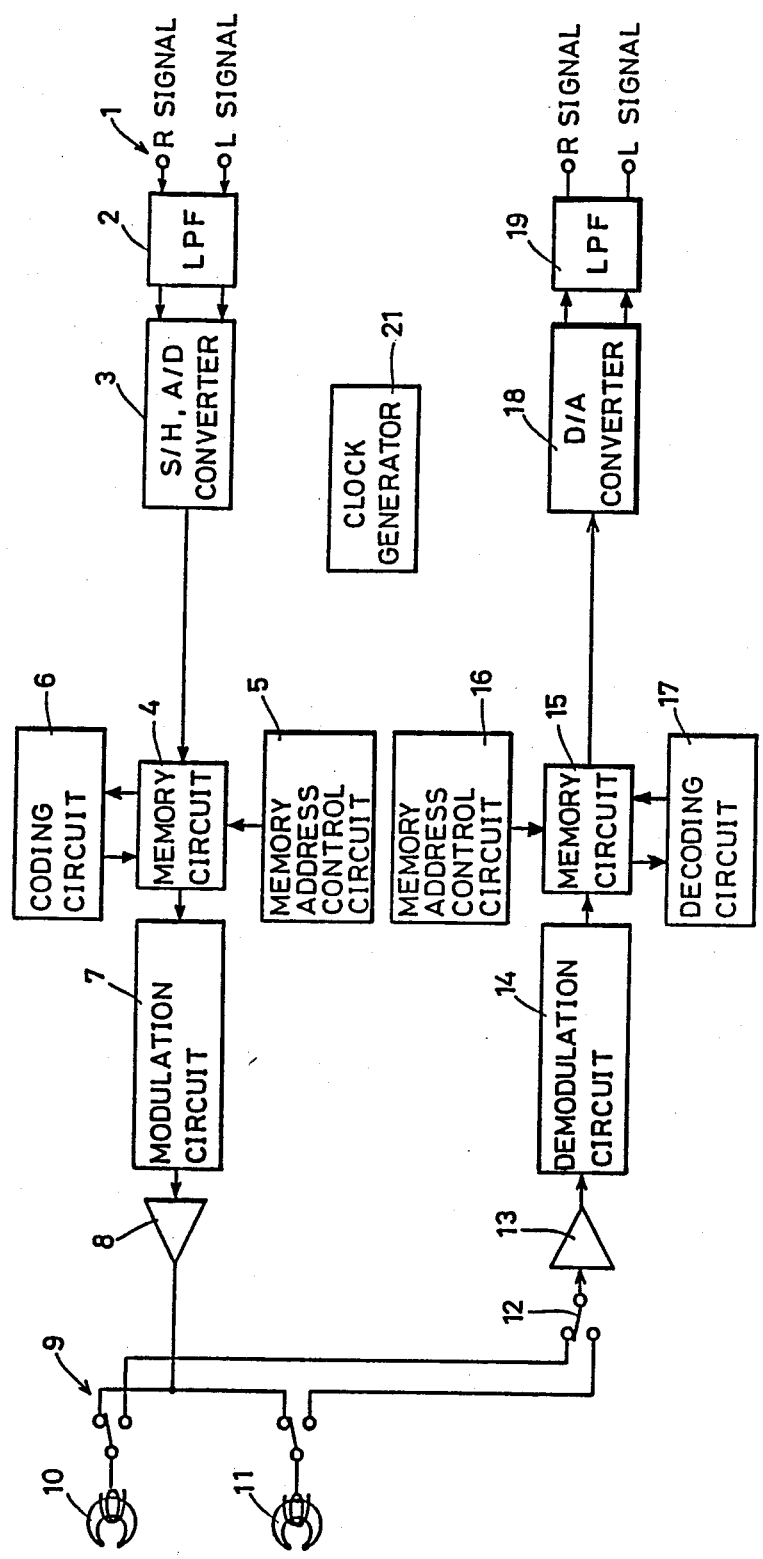
FIG. 5 is a roughly illustrated block diagram showing an embodiment of the present invention.

FIG. 5 is a roughly illustrated block diagram showing an embodiment of the present invention and FIG. 6 is a roughly illustrated block diagram showing a memory address control circuit as shown in FIG. 5.

Description is now made on structure of the present embodiment with reference to FIGS. 5 and 6. A rotary head-type PCM magnetic recorder/reproducer consists of a recording system and a reproducing system. A two-channel input terminal 1 of the recording system receives analog audio signals The analog audio signals inputted in the input terminal 1 are supplied to a low-pass filter 2 to be band-restricted. Then the analog audio signals passed through the low-pass filter 2 are inputted in a sample-and-hold/A-D converter circuit 3. The sample-and-hold/A-D converter circuit 3 converts the analog audio signals into digital signals. The digitally converted signals are supplied to a memory circuit 4 to be stored therein. The memory circuit 4 is address-controlled by a memory address control circuit 5.

As shown in FIG. 6, the memory address control circuit 5 is formed by a sample writing address generator circuit 501, a coding address generator circuit 502, a data reading address generator circuit 503 and a selector 504 which receives respective outputs from the sample writing address generator circuit 501, the coding address generator circuit 502 and the data reading address generator circuit 503 for making selective outputs at an address output terminal 505. A coding circuit 6 is provided in relation to the memory circuit 4. The coding circuit 6 generates codes for correcting and detecting errors in the digital signals stored in the memory circuit 4. The digital signals read from the memory circuit 4 are supplied to a modulation circuit 7 to be modulated by the same. The modulated digital signals are amplified by a recording amplifier 8, to be supplied to either a rotary head 10 or 11 which is selected by a first selection switch 9.

The digital signals reproduced by the rotary heads 10 and 11 are inputted through a second selection switch 12 for selecting the rotary head 10 or 11 in a reproducing amplifier 13. The reproducing amplifier 13 amplifies the reproduced digital signals to supply the same to a demodulation circuit 14. The demodulation circuit 14 demodulates the reproduced digital signals, to supply the demodulated outputs to a memory circuit 15. The memory circuit 15 is connected with a memory address control circuit 16, which controls addresses of the memory circuit 15. The memory circuit 15 is further connected with a decoding circuit 17. The decoding circuit 17 is adapted to correct and detect errors in the reproduced digital signals. The reproduced digital signals read from the memory circuit 15 are supplied to a D-A converter circuit 18, to be converted into analog signals. The converted analog signals are outputted at an output terminal 20 through a low-pass filter 19.

Operation in the recording system is now described. The input terminal 1 receives analog audio signals of left and right channels, which are respectively band-restricted by the low-pass filter 2. The outputs from the low-pass filter 2 are supplied to the sample-and-hold/A-D converter circuit 3, to be converted into digital signal $W_{Ln}$ and $W_{Rn}$. Symbol n represents order of sampling, and the analog signals of the left and right channels are subsequently sampled to be alternately outputted as digital signal $W_{L0}$, $W_{R0}$, $W_{R1}$, $W_{L2}$, $W_{R2}$, . . . The digital signals $W_{Ln}$ and $W_{Rn}$ are supplied to the memory circuit 4 to be subsequently written in the same with memory addresses being controlled by the sample writing address generator circuit 501 of the address control circuit 5 provided in relation to the memory circuit 4. The address control operation is hereinafter described in detail.

The coding circuit 6 provided in relation to the memory circuit 4 reads necessary samples included in the digital signals stored in the memory circuit 4 for generating error correction codes and again writing the same in the a memory circuit 4. The digital signals and the error correction codes are subsequently read by the address control circuit 5. The read digital signals are inputted in the demodulation circuit 7, to be converted into signals appropriate for recording in the magnetic tape. The converted signals are amplified by the recording amplifier 8, to be recorded in the magnetic tape by the two rotary heads 10 and 11 through the first selection switch 9. The first selection switch 9 is adapted to switch the circuits to be connected with the rotary heads 10 and 11 in recording and reproducing of the signals.

Operation in the reproducing system is now described. The reproduced digital signals read from the two rotary heads 10 and 11 are supplied to the second selection switch 12 through the first selection switch 9. The second selection switch 12 is adapted to supply the signals read from the rotary heads 10 and 11 to the reproducing amplifier 13 as single-system signals. The reproduced digital signals are amplified by the reproducing amplifier 13, to be supplied to the demodulation circuit 14. The demodulation circuit 14 demodulates the reproduced digital signals to those before modulation, to supply the same to the memory circuit 15. The memory circuit 15 is address-controlled by the memory address control circuit 16, to write the reproduced digital signals. The decoding circuit 17 provided in relation to the memory circuit 15 reads necessary samples from the memory circuit 15 to correct and detect errors. The corrected samples in the memory circuit 15 are subsequently read therefrom by the memory address control circuit 16, to be supplied to the D-A converter circuit 18. The D-A converter circuit 18 converts the digital signals into analog signals, to supply the same to the low-pass filter 19. The low-pass filter 19 performs band restriction of the analog signals, to output the same from the output terminal 20.

A clock generator circuit 21 is adapted to generate clock pulses required for the respective components of the recording and reproducing systems.

In relation to the memory circuits 4 and 15 as shown in FIG. 5, description is now made in means for performing the aforementioned data interleaving operation employed in the rotary head-type PCM magnetic recorder/reproducer according to the present invention.

FIG. 7 is an illustration showing an example of samples stored in the memory circuit as shown in FIG. 5. In FIG. 7, the magnetic heads 10 and 11 respectively record 32 samples in the left and right channels respectively during an interval for scanning the magnetic tape. Numerals in the lateral direction indicate column unit memory addresses (hereinafter referred to as "frame addresses") and numerals in the vertical direction indicate row unit memory addresses (hereinafter referred to as "sample addresses").

In the recording system, the A-D converted and subsequently supplied samples $W_{L0}$, $W_{R0}$, $W_{R1}$, . . . are written in the memory circuit 4 with addresses controlled by the address control circuit 5 to be in the array as shown in FIG. 6. In other words, the samples are subsequently written in the memory circuit 4 with sample address being set at 0 and the frame address being set at 0, 8, 12, 4, . . . When the frame address comes to 7 and the sample $W_{R7}$ is written in the memory circuit 4, the sample address is updated by 1 so that a given number of samples are written in the memory circuit 4 with the frame addresses being again controlled. The samples are thus arrayed in the form of a matrix of 4×16, while even sample groups and odd sample groups of the respective channels are already separated from each other. With respect to the sample matrix thus formed, the coding circuit 6 as shown in FIG. 5 performs encoding of the samples read by the coding address generator circuit 502 of the memory address control circuit 5, whereas explanation of such encoding operation is omitted since the same is not the substance of the present invention. It is to be noted that codes $C_{Ln}$ and $C_{Rn}$ are utilized as error correction codes in the unit of frames.

The data reading address generator circuit 503 of the memory address control circuit 5 subsequently reads the samples from the memory circuit 4 in the unit of frames with vertical four samples and one error correction word processed as one frame. In other words, the memory address control circuit 5 sets the frame address at 0 and subsequently updates the sample address as 0, 1, 2, . . . , and when an error correction word is read at the sample address of 4, it updates the frame address by 1 to read the samples. The data to the frame address of 7 are arrayed in one scanning interval, and scanning of the whole data in the memory circuit 4 is completed by performing operation for two scanning intervals.

The data thus read from the memory circuit 4 are in the magnetization pattern as shown in FIG. 8 on the magnetic tape, and are arrayed as shown in FIG. 3. In the signals recorded in the aforementioned manner, no continuous error takes place even if a burst error is caused by interruption of signals in one scanning interval or in the tape travelling direction in half the width of the magnetic tape from the edge thereof, and hence compensation by mean value interpolation is enabled.

The aforementioned operation for controlling the addresses in writing of the samples in the memory circuit 4 may appropriately be changed for obtaining the magnetization pattern as shown in FIG. 4.

As hereinabove described, the present embodiment is characterized in that even samples and odd samples are permutated in the unit of groups and that the samples in the respective groups are recorded in positions separated from those in continuity therewith along the direction of scanning as shown in FIG. 8. For example, with respect to a frame $1_{L2}$ including a sample $W_{L2}$, frames $1_{L1}$ and $1_{L3}$ including data $W_{L1}$ and $W_{L3}$ which are in continuity with the sample $W_{L2}$ are arrayed in positions separated from the frame $1_{L2}$ along the tape travelling direction in FIG. 8. More specifically, the data $W_{L2}$ and $W_{L1}$ are separated from each other by a distance $X_2$, and no continuous sample error is caused to a burst error in the tape travelling direction in a width smaller than the length $X_2$.

Assuming that $\alpha$ frames are recorded in one scanning interval, the distance $X_2$ is found as follows:

$$X_2 = (\alpha/2 - 1)X_1/\alpha$$

In practice, 200 to 300 frames are generally recorded in one scanning interval, and hence $X_2 \simeq X_1/2$, and hence no continuous sample error takes place even if an error is caused in the tape travelling direction in about one-half the width of the magnetic tape. Further, as hereinabove described, no continuous sample error takes place by signal interruption caused in one scanning interval, and hence compensation by mean value interpolation is enabled.

Figure 9:
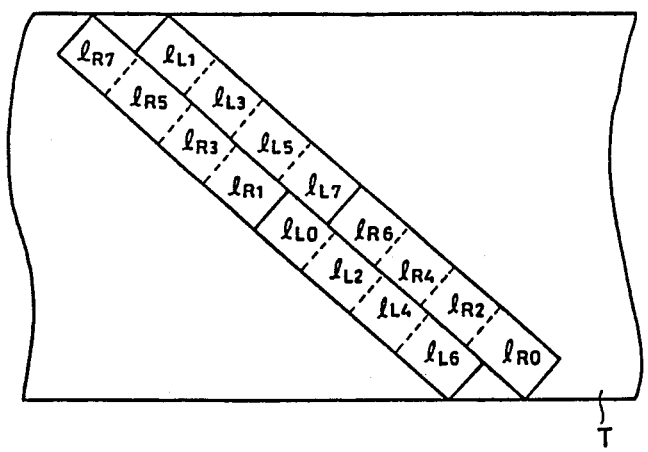
FIG. 9 is an illustration showing a magnetization pattern according to another embodiment of the present invention.

FIG. 9 is an illustration showing another example of the sample array. Although frame arrangement of the right channel in the sample array as shown in FIG. 9 is different in order from that shown in FIG. 7, a similar effect can be obtained also by such array as the matter of course. The magnetization pattern as shown in FIG. 9 can be implemented by simply changing the address control circuits 5 and 16 as shown in FIG. 5.

Figure 11:
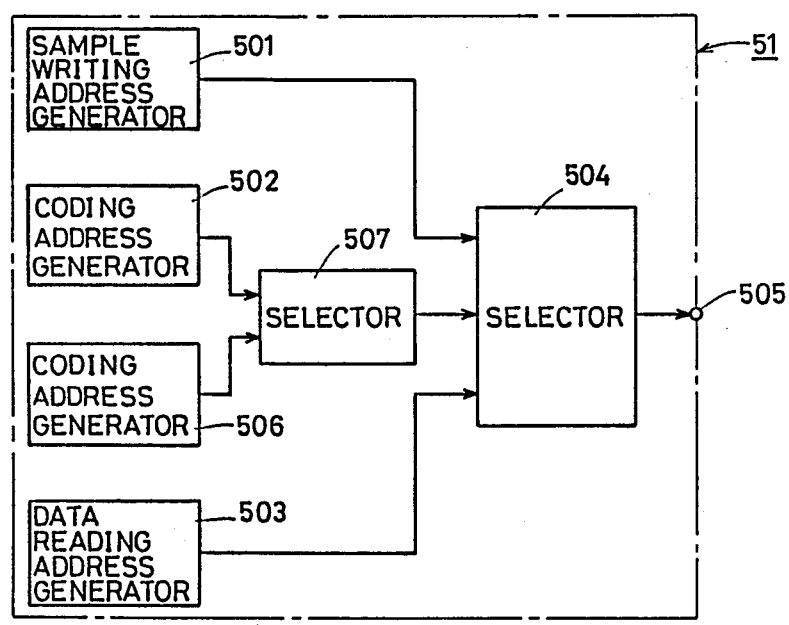
FIG. 11 is a roughly illustrated block diagram showing a memory address control circuit as shown in FIG. 10.
Figure 10:
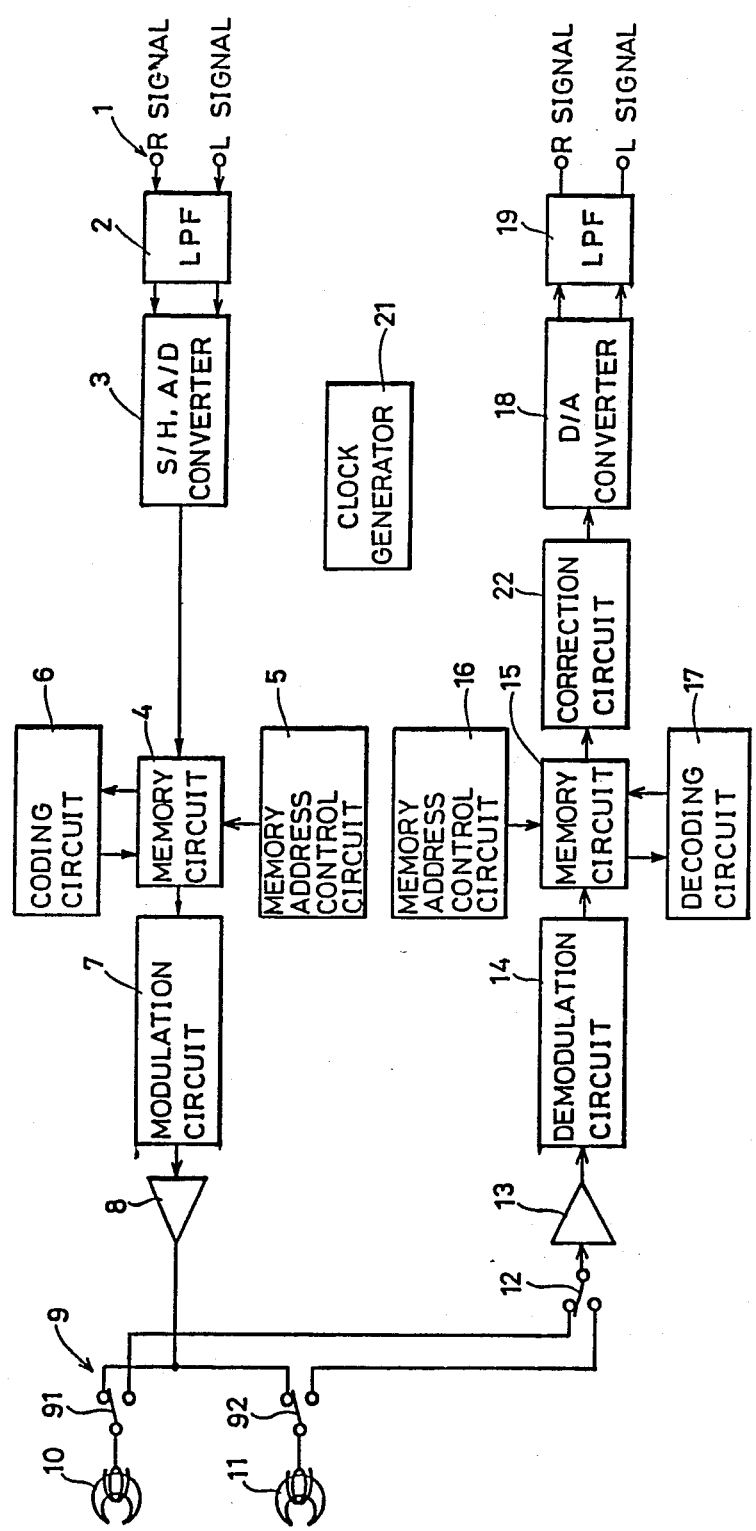
FIG. 10 is a roughly illustrated block diagram showing another embodiment of the present invention.

FIG. 10 is a roughly illustrated block diagram showing another embodiment of the present invention, and FIG. 11 is a roughly illustrated block diagram of a memory address control circuit as shown in FIG. 10. A rotary head-type PCM magnetic recorder/reproducer as shown in FIG. 10 is substantially identical to that shown in FIG. 5 except for that a correction circuit 22 is provided between a memory circuit 15 and a D-A converter circuit 18 of the reproducing system and a memory address control circuit 51 is structured as shown in FIG. 11. The correction circuit 22 is adapted to perform correction by the aforementioned mean value interpolation of samples not corrected though errors are detected.

The memory address control circuit 51 comprises a sample writing address generator circuit 501, a first coding address generator circuit 502, a data reading address generator circuit 503, a second coding address generator circuit 506, a second selector 507 for receiving and selectively outputting the outputs from the first and second coding address generator circuits 502 and 506 and a first selector 504 for receiving the outputs from the sample writing address generator circuit 501, the data reading address generator circuit 503 and the second selector 507 and selectively outputting the same at an address output terminal 505.

FIG. 12 is a timing chart showing operation of the memory circuits as shown in FIG. 10. In FIG. 12, the rotary head-type PCM magnetic recorder/reproducer performs two-head recording/reproducing operation by 90° tape winding, and hence signal recording/reproducing intervals of 90° and pause intervals of 90° alternately appear in the recorded/reproduced waveforms as shown in FIG. 12(a). In other words, a signal recording/reproducing interval of 90° corresponds to recording/reproducing operation in one scanning interval. Within signals for two scanning intervals sampled in a writing interval WT to the memory circuit 4 as shown in FIG. 12(b), signals for one scanning interval to be read in a reading interval RD for subsequent reading from the memory circuit 4 are encoded in an encoding interval EN to be read in the reading interval RD. Then the signals for the remaining scanning interval are encoded in the subsequent encoding interval EN, to be read in the reading interval RD.

Shown in FIG. 12(c) is operation of the memory circuit 15 in reproducing operation. In the writing interval WT, the reproduced sample signals for one scanning interval are written in the memory circuit 15, and are decoded in a subsequent decoding interval DE to be written in the memory circuit 15. Then the sample signals for the remaining scanning interval are written in the memory circuit 15 in the subsequent writing interval WT, to be decoded in the subsequent decoding interval DE. The decoded samples for two scanning intervals are read in the reading interval RD. In recording operation, the samples supplied as $W_{L0}$, $W_{R0}$, $W_{L1}$, . . . are subjected to memory address control by the sample writing address generator circuit 501 of the memory address control circuit 51 and written in the memory circuit 15, to be in the array as shown in FIG. 12.

FIG. 13 is an illustration showing an example of samples stored in the memory circuits as shown in FIG. 10. FIG. 13 is different from FIG. 7 in that 26 words are stored as error correction codes in addition to 32 samples of the left and right channels as data for two scanning intervals.

Operation of another embodiment of the present invention is now described with reference to FIG. 13. Encoded first are samples $1_{L0}$, $1_{L2}$, $1_{L4}$, $1_{L6}$, $1_{R1}$, $1_{R3}$, $1_{R5}$ and $1_{R7}$ to be recorded in the form of a matrix of $8 \times 4$. Then the second coding address generator circuit 506 generates error correction codes $P_0$ to $P_4$, and then generates error correction codes $C_{L0}$, $C_{L2}$, $C_{L4}$, $C_{L6}$, $C_{R1}$, $C_{R3}$, $C_{R5}$ and $C_{R7}$ with respect to samples read by the first coding address generator circuits 502. The encoded data of frame addresses of 0 to 8 are subsequently read in order of frame numbers by the data reading address generator circuit 503 of the memory address control circuit 51 in the unit of frames, with a frame $1_{P0}$ of the error correction code being read after a frame number 3 to be inserted between intervals La and Rb, thereby recorded in the magnetic tape.

After reading of the samples for one scanning interval is completed, the samples for the remaining scanning interval are similarly encoded to be recorded in the adjacent scanning interval. Although continuous samples in the respective groups are thus distributed in two scanning intervals, the error correction codes are completed with respect to data for one scanning interval to be recorded in the magnetic tape, and are not extended over two scanning intervals.

In reproducing operation, the data are written in the memory circuit 15 in the unit of frames contrary to the recording operation, and are corrected by the error correction codes to be subsequently read as $W_{L0}$, $W_{R0}$, $W_{L1}$, . . . The error correction codes are completed in one scanning interval as hereinabove described, and hence the samples can be decoded upon reading of the data for one scanning interval. This operation is identical to that hereinabove described with reference to FIG. 12, and since data for two scanning intervals are gathered in codes extended over two scanning intervals, the data must be decoded with respect to two scanning intervals in the subsequent decoding interval of 90°. However, the data are decoded per scanning interval in the present embodiment, and hence the clock rate required for encoding and decoding of the data is not increased by data interleaving for two scanning intervals.

Figure 14:
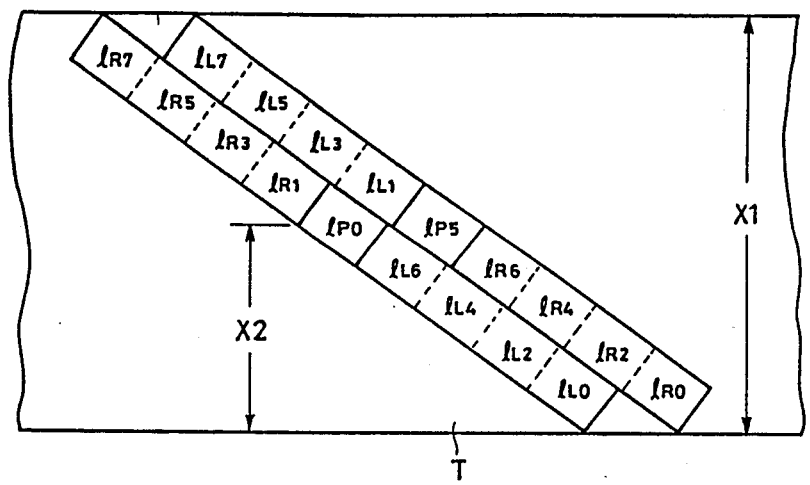
FIG. 14 illustrates a magnetization pattern showing frame array recorded by the sample groups as shown in FIG. 13.

FIG. 14 illustrates the magnetization pattern recorded on the magnetic tape by the memory circuit structure as shown in FIG. 13. In FIG. 14, symbol $X_1$ indicates the width of the magnetic tape and symbol $X_2$ indicates the width of the burst error capable of correction by mean value interpolation. In the example as shown in FIG. 14, reading addresses in recording operation are so controlled that frames $1_{P0}$ and $1_{P5}$ of error correction codes are located in the middle of one scanning interval, whereas the frames $1_{P0}$ and $1_{P5}$ may be located in any position of the scanning interval.

As hereinabove described, no continuous sample errors are caused in the magnetization pattern as shown in FIG. 14 even if the signals are interrupted for one scanning interval and a burst error is caused in the tape travelling direction in half the tape width from the edge of the magnetic tape, whereby mean value interpolation is enabled.

Figure 15:
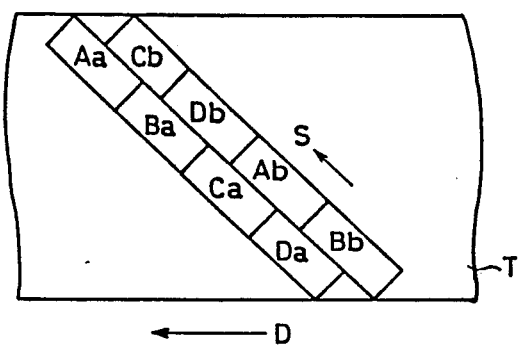
FIG. 15 is an illustration showing a magnetization pattern according to still another embodiment of the present invention.

FIG. 15 illustrates a magnetization pattern according to still another embodiment of the present invention. The magnetization pattern as shown in FIG. 15 is applied to four channels A, B, C and D. Also in the case of four channels, no continuous sample errors are caused in the respective channels even if the signals are interrupted for one scanning interval and a burst error is caused in the tape travelling direction in half the tape width from the edge of the magnetic tape, whereby mean value interpolation is enabled similarly to the case of two channels.

Although each of the above embodiments has been described with respect to a rotary head type PCM magnetic recorder/reproducer which processes audio signals, the present invention may, needless to say, be applied to a device for processing signals correctable by mean value interpolation such as video signals, and further to digital signal recording/reproducing systems other than the PCM system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A helical scanning magnetic recording method for recording two channel data by dividing data for two channels to be recorded on two tracks into predetermined units corresponding respectively to a first half and a second half of each of said tracks relative to a central portion thereof, said two tracks forming a pair, said helical scanning magnetic recording method comprising:
separating said prescribed amount of data into even samples and odd samples for each channel,
recording the even samples of a first channel on the first one-half of a first track and the odd samples of a second channel on the second half of said first track, and
recording the even samples of the second channel on the first half of a second track and the odd samples of the first channel on the second half of said second track.

2. A helical scanning magnetic recording method for recording two channel data by dividing data for two channels to be recorded on two tracks into predetermined units corresponding respectively to a first half and a second half of each of said tracks relative to a central portion thereof, said two tracks forming a pair, said helical scanning magnetic recording method comprising:
separating said prescribed amount of data into even samples and odd samples for each channel,
recording the even samples of a first channel on the first half of a first track and the even samples of a second channel on the second half of said first track, and
recording the odd samples of the second channel on the first half of a second track and the odd samples of the first channel on the second half of said second track.

3. A magnetic reproducing method for reproducing data from a magnetic record medium by a helical scanning system, wherein:
data for two channels arrayed on two tracks is separated into even samples and odd samples for each channel, each of said two tracks forming a respective pair and being divided into a first half and a second half with respect to a central portion thereof; the even samples of a first channel are arrayed on the first half of a first track; the odd samples of a second channel are arrayed on the second half of said first track; the even samples of the second channel are arrayed on the first half of a second track; and the odd samples of the first channel are arrayed on the second half of said second track, said magnetic reproducing method comprising:
reproducing the even samples of the first channel from the first half of said first track and the odd samples of the second channel from the second half of said first track, and
reproducing the even samples of the second channel from the first half of said second track and the odd samples of the first channel form the second half of said second track.

4. A magnetic reproducing method for reproducing data from a magnetic record medium by a helical scanning system, wherein:
data for two channels arrayed on two tracks is separated into even samples and odd samples for each channel, each of said two tracks forming a respective pair and being divided into a first half and a second half with respect to a central portion thereof; the even samples of a first channel are arrayed on the first half of a first track; the even samples of a second channel are arrayed on the second half of said first track; the odd samples of the second channel are arrayed on the first half of a second track; and the odd samples of the first channel are arrayed on the second half of said second track, said magnetic reproducing method comprising:
reproducing the even samples of the first channel from the first half of said first track and the even samples of the second channel from the second half of said first track, and reproducing the odd samples of the second channel from the first half of said second track and the odd samples of the first channel from the second half of said second track.

5. A helical scanning magnetic recording and reproducing method wherein data for two channels to be recorded on two tracks forming a pair is divided into predetermined units corresponding respectively to a first half and a second half of each of said tracks with respect to a central portion thereof, so that said divided data is recorded and reproduced, said helical scanning magnetic recording and reproducing method comprising:

for recording, separating said prescribed amount of data into even samples and odd samples for each channel, recording the even samples of a first channel on the first half of a first track and the odd samples of a second channel on the second half of said first track, recording the even samples of the second channel on the first half of a second track and the odd samples of the first channel on the second half of said second track, for reproducing, reproducing the even samples of the first channel form the first half of said first track and the odd samples of the second channel from the second half of said first track, and reproducing the even samples of the second channel from the first half of said second track and the odd samples of the first channel from the second half of said second track.

6. A helical scanning magnetic recording and reproducing method wherein data for two channels to be recorded on two tracks forming a pair is divided into predetermined units corresponding respectively to a first half and a second half of each of said tracks with respect to a central portion thereof, so that said divided data is recorded and reproduced, said helical scanning magnetic recording and reproducing method comprising:

for recording, separating said prescribed amount of data into even samples and odd samples for each channel, recording the even samples of a first channel on the first half of a first track and the even samples of a second channel on the second half of said first track, recording the odd samples of the second channel on the first half of a second track and the odd samples of the first channel on the second half of said second track, for reproducing, reproducing the even samples of the first channel from the first half of said first track and the even samples of the second channel from the second half of said first track, and reproducing the odd samples of the second channel from the first half of said second track and the odd samples of the first channel from the second half of said second track.

7. A helical scanning magnetic recording method wherein:

data is divided by a prescribed amount for two channels to be recorded on two tracks forming a pair; a redundancy signal for error correction or error detection is generated from data to be recorded on one track; at least part of said redundancy signal is located a center portion of each track; each track is divided into first and second halves with respect to said part of said redundancy signal at the center thereof; and said divided data for said two tracks forming a pair are recorded to be arrayed on the first and second halves of each track, said helical scanning magnetic recording method comprising:

separating said prescribed amount of data into even samples and odd samples for each channel, recording the even samples of a first channel on the first half of a first track and the odd samples of a second channel on the second half of said first track, and recording the even samples of the second channel on the first half of a second track and the odd samples of the first channel on the second half of said second track.

8. A helical scanning magnetic recording method wherein:

data is divided by a prescribed amount for two channels to be recorded on two tracks forming a pair; a redundancy signal for error correction or error detection is generated from data to be recorded on one track; at least part of said redundancy signal is located at a center portion of each track; each track is divided into first and second halves with respect to said part of said redundancy signal at the center thereof; and said divided data for said two tracks forming a pair are recorded to be arrayed on the first and second halves of each track, said helical scanning magnetic recording method comprising:

separating said prescribed amount of data into even samples and odd samples for each channel, recording the even samples of a first channel on the first one-half of a first track and the even samples of a second channel on the second half of said first track, and recording the odd samples of the second channel on the first one-half of a second track and the odd samples of the first channel on the second half of said second track.

9. A magnetic reproducing method for reproducing data from a magnetic record medium by a helical scanning system, wherein:

at least part of a redundancy signal for error correction or error detection is located nearly at a center of each track; data for two channels recorded on two tracks is separated into even samples and of samples for each channel, each of said two tracks forming a respective pair and being divided into a first half and a second half with respect to said part of said redundancy signal at the center thereof; the even samples of a first channel are arrayed on the first half of a first track; the odd samples of a second channel are arrayed on the second half of said first track; the even samples of the second channel are arrayed on the first half of a second track; and the odd samples of the first channel are arrayed on the second half of said second track, said magnetic reproducing method comprising:

reproducing the even samples of the first channel from the first half of said first track and the odd samples of the second channel from the second half of said first track, and reproducing the even samples of the second channel from the first half of said second track and the odd samples of the first channel from the second half of said second track.

10. A magnetic reproducing method for reproducing data from a magnetic record medium by a helical scanning system, wherein:

at least part of a redundancy signal for error correction or error detection is located nearly at a center of each track; data for two channels recorded on two tracks is separated into even samples and odd samples for each channel, each of said two tracks forming a respective pair and being divided into a first half and a second half with respect to said part of said redundancy signal at the center thereof; the even samples of a first channel are arrayed on the first half of a first track; the even samples of a second channel are arrayed on the second half of said first track; the odd samples of the second channel are arrayed on the first half of a second track; and the odd samples of the first channel are arrayed on the second half of said second track, said magnetic reproducing method comprising:

reproducing the even samples of the first channel from the first half of said first track and the even samples of the second channel from the second half of said first track, and reproducing the odd samples of the second channel from the first half of said second track and the odd samples of the first channel from the second half of said second track.

11. A helical scanning magnetic recording and reproducing method for recording and reproducing data, wherein:

a prescribed amount of data for two channels recorded on two tracks and forming a pair is divided into prescribed units; a redundancy signal for error correction or error detection is generated from data recorded on one track; at least part of said redundancy signal is located nearly at a center of each track; each of said two tracks forming said pair is divided into first and second halves with respect to said part of said redundancy signal at the center thereof; and said prescribed amount of data is allotted to said first and second halves which correspond to said prescribed units, said helical scanning magnetic recording and reproducing method comprising:

for recording, separating said prescribed amount of data into even samples and odd samples for each channel, recording the even samples of a first channel on the first half of a first track, recording the odd samples of a second channel on the second half of said first track, recording the even samples of the second channel on the first half of a second track, and recording the odd samples of the first channel on the second half of said second track, for reproducing, reproducing the even samples of the first channel from the first half of said first track and the odd samples of the second channel from the second half of said first track, and reproducing the even samples of the second channel from the first half of said second track and the odd samples of the first channel from the second half of said second track.

12. A helical scanning magnetic recording and reproducing method for recording and reproducing data, wherein:

a prescribed amount of data for two channels recorded on two tracks and forming a pair is divided, into prescribed units; a redundancy signal for error correction or error detection is generated form data recorded on one track; at least part of said redundancy signal is located nearly at a center of each track; each of said two tracks forming said pair is divided into first and second halves with respect to said part of said redundancy signal at the center thereof; and said prescribed amount of data is allotted to said first and second halves which correspond to said prescribed units, said helical scanning magnetic recording and reproducing method comprising:

for recording, separating said prescribed amount of data into even samples and odd samples for each channel, recording the even samples of a first channel on the first half of a first track, recording the even samples of a second channel on the second half of said first track, recording the odd samples of the second channel on the first half of a second track, and recording the odd samples of the first channel on the second half of said second track, for reproducing, reproducing the even samples of the first channel from the first half of said first track and the even samples of the second channel from the second half of said first track, and reproducing the odd samples of the second channel from the first half of said second track and the odd samples of the first channel from the second half of said second track.

13. A recording method for recording data, wherein a prescribed amount of data for a plurality of channels to be recorded on two tracks is divided into prescribed units, said two tracks being regarded as a pair, said recording method comprising:

separating said prescribed amount of data into even samples and odd samples, and recording, by a helical scanning system, the odd samples and the even samples of a single one of said channels on different tracks and at positions separated from each other in a scanning direction, based on digital signals from said plurality of channels.

14. A magnetic reproducing method for reproducing data from a magnetic record medium by a helical scanning system, wherein:

data for a plurality of channels recorded on two tracks is separated into even samples and odd samples for each channel, said two tracks forming a respective pair; the odd samples and the even samples of a single one of said channels are arrayed on different tracks and at positions separated from each other in a scanning direction, said magnetic reproducing method comprising:

reproducing data of each channel based on the odd and even samples arrayed on said different tracks at positions separated from each other in the scanning direction.

15. A magnetic recording and reproducing method for recording and reproducing data, wherein a prescribed amount of data for a plurality of channels recorded on two tracks is divided into prescribed units, said two tracks forming a pair, said magnetic recording and reproducing method comprising:

for recording, separating digital signals from the plurality of channels into odd samples and even samples for each channel, recording, based on the separated digital signals from the plurality of channels, the odd samples and the even samples of a single one of said channels on different tracks and at positions separated form each other in a scanning direction, and for reproducing, reproducing the data of each channel based on said odd samples and said even samples recorded on said different tracks at said positions separated in the scanning direction.

16. A helical scanning magnetic recording method, wherein:
a prescribed amount of data for a plurality of channels to be recorded on two tracks is divided into prescribed units; a redundancy signal for error correction or error detection is generated form data recorded on one track; at least a part of said redundancy signal is located nearly at a center of each track; and said prescribed amount of data is allotted to first and second halves of each track with respect to said part of said redundancy signal at the center thereof corresponding to said prescribed units, said two tracks being regarded as a pair, said helical scanning magnetic recording method comprising:
separating said prescribed amount of data into even samples and odd samples for each channel, and
recording the even samples and the odd samples of the same channel by allotting separately said even samples and said odd samples to different halves of different tracks.

17. A helical scanning magnetic reproducing method for reproducing data from a magnetic record medium, wherein a prescribed amount of data for a plurality of channels to be recorded on two tracks is divided into the prescribed units; a redundancy signal for error correction or error detection is generated from data recorded on one track; at least part of said redundancy signal is located nearly at a center of each track; and said divided data is allotted to first and second halves of each of said two tracks regarded as a pair, said helical scanning magnetic reproducing method comprising:
reproducing said data for said plurality of channels based on odd samples and even samples of the same channel arrayed separately on different halves of different tracks.

18. A helical scanning magnetic recording and reproducing method for recording and reproducing data, wherein:
data is divided by a prescribed amount for a plurality of channels recorded on two tracks regarded as a pair;
a redundancy signal for error correction or error detection is generated from data recorded on one track; at least a part of said redundancy signal is located nearly at a center of each track; and said divided data is arrayed on first and second halves of each of said two tracks with respect to said part of said redundancy signal at the center, said helical scanning magnetic recording and reproducing method comprising:
separating said prescribed amount of data into even samples and odd samples of each channel,
recording the even samples and the odd samples of the same channel by allotting separately said even samples and said odd samples to different halves of different tracks, and
reproducing said data for said plurality of channels based on the odd samples and the even samples of the same channel recorded separately on the first half of said first track and the second half of said second track, respectively, or on the second half of said first track and the first half of said second track, respectively.

19. A magnetic tape wherein digital signals from a plurality of channels are arrayed on a plurality of different tracks, said magnetic tape defining a scanning direction substantially perpendicular to a travel direction thereof and including:
a record pattern wherein odd and even samples of data from each channel are separately arrayed on different tracks and wherein odd samples and even samples of data from the same channel are arrayed at positions separated form each other in a scanning direction of the tape.

20. A magnetic tape as recited in claim 19 wherein digital signals from two channels A and B are arrayed thereon, said magnetic tape including:
a record pattern wherein the even samples of the channel A and the odd samples of the channel B are arrayed on a first track and the odd samples of the channel A and the even samples of the channel B are arrayed on a second track, the odd samples of the channel A and the even samples of the channel A being recorded at positions separated from each other in the scanning direction of the tape.

21. A magnetic tape as recited in claim 19 wherein digital signals from two channels A and B are arrayed thereon, said magnetic tape including:
a record pattern wherein the even samples of the channel A and the even samples of the channel B are arrayed on a first track and the odd samples of the channel A and the odd samples of the channel B are arrayed on a second track, the odd samples of the channel A and the even samples of the channel A being recorded at positions separated from each other in the scanning direction of the tape.

22. A magnetic tape wherein digital signals from two channels A and B are recorded on a plurality of different tracks, said magnetic tape including:
a record pattern including redundant words for error correction or error detection generated from an information signal recorded on one track, wherein at least a part of said redundant words are collected and arrayed in a center portion of the track and wherein the redundant words in the center of said track form a boundary, and wherein even samples of data from the channel A and odd samples of data from the channel B are arrayed on the first track and odd samples of data form the channel A and even samples of data from the channel B are arrayed on the second track, the even samples and the odd samples of data from the same channel arrayed at positions separated from each other in a scanning direction of the tape.

23. A magnetic tape wherein digital signals from two channels A and B are recorded on a plurality of different tracks, said magnetic tape including:
a record pattern including redundant words for error correction or error detection generated from an information signal recorded on one track, wherein at least a part of said redundant words are collected and arrayed in a center portion of the track and wherein the redundant words in the center of said track from a boundary, and wherein even samples of data from the channel A and even samples of data from the channel B are arrayed on the first track and odd samples of data from the channel A and odd samples of data from the channel B are arrayed on the second track, the even samples and the odd samples of data from the same channel arrayed at positions separated from each other in a scanning direction of the tape.

24. A magnetic tape wherein signals of N channels are arrayed to form tracks in a slant manner, said magnetic tape including:

a record pattern in which the odd samples and the even samples of each channel are arrayed on different tracks and the odd samples and the even samples of the same channel are arrayed at positions separate from each other in the transverse direction of the tape, and at least a part of redundant words for error correction or error detection generated from a signal recorded on one track are generated and arrayed in the center of the track which has generated the redundant words.

* * * * *

UNITED STATES PATENT AND TRADEMARK OFFICE
CERTIFICATE OF CORRECTION

PATENT NO. : 4,835,627

DATED : May 30, 1989

INVENTOR(S) : Kazuhito ENDO et al.

It is certified that error appears in the above-identified patent and that said Letters Patent is hereby corrected as shown below:

Column 3, line 48, replace "FIGS. 12A-C" by --FIGS. 12a-12c--.

In the claims, at claim 1, line 12 and claim 8, lines 18 and 22, found at column 9, line 68 and column 12, lines 36 and 40, replace "first one-half" by --first half-- in each occurrence; claim 7, line 8, found at column 12, line 2, after "located" insert --at--; claim 22, line 13, found at column 16, line 51, replace "form" by --from--.

In the drawings, in sheets 3 and 6, showing Figures 5 and 10, respectively, a reference numeral 20 should be applied by an arrowhead to the output terminals of the block labelled 19, similarly to application of the reference numeral "1" by an arrowhead to the input terminals of the block labelled 2.

Signed and Sealed this

Fourth Day of February, 1992

Attest:

HARRY F. MANBECK, JR.

Attesting Officer

Commissioner of Patents and Trademarks